PACKAGED MAGNETIC AMPLIFIER

Filed Nov. 21, 1951 2 Sheets-Sheet 1

INVENTORS
HERBERT HERZ
ANDREW A. STERK
HAROLD A. GOLDSMITH
BY
Greene, Pineles & Durr
ATTORNEYS

INVENTORS
HERBERT HERZ
ANDREW A. STERK
HAROLD A. GOLDSMITH

BY

Greene, Pineles & Durr
ATTORNEYS 2,849,544

PACKAGED MAGNETIC AMPLIFIER

Herbert Herz, Forest Hills, Andrew A. Sterk, New York, and Harold A. Goldsmith, Elmhurst, N. Y., assignors to Magnetic Amplifiers, Inc., Long Island City, N. Y., a corporation of New York Application November 21, 1951, Serial No. 257,598

2 Claims. (Cl. 179—171)

This invention relates to a packaged magnetic amplifier.

Among the objects of the invention is to provide a completely self-contained and adjusted magnetic amplifier which is ready for operation when inserted into a circuit, in other words, the "package" constitutes the complete amplifier.

It is also among the objects of the invention to provide a push-pull type of magnetic amplifier with a novel "sliding bias" which is at least partially proportional to the output voltage.

These objects and others ancillary thereto are obtained by combining two single stage magnetic amplifiers with an external feedback principal, each of which is similar to the magnetic amplifier disclosed by Alexanderson in U. S. Patent No. 1,328,797. These two stages are interconnected through a balanced output transformer to supply a phase reversible (with respect to the line) alternating current to the load, which could be a two phase induction motor, for example. No bias in the ordinary sense is employed in the amplifier of the invention, for example, no separate battery circuit and no separate rectifier biasing circuit is added. In some amplifiers where special characteristics are desired such as an increased gain with good stability, an "automatic bias" circuit is added. Only two full wave rectifiers are required in the packaged device of the invention.

The foregoing and other objects of the invention will best be understood from the following description of exemplifications of the same when read in connection with the accompanying drawing in which.

Figure 1:
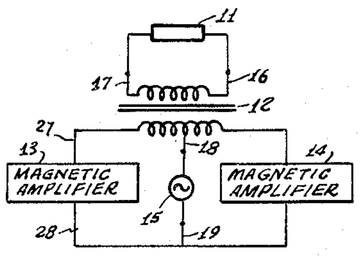
Fig. 1 shows the basic circuit diagram.

As illustrated in Fig. 1 the packaged magnetic amplifier of the invention comprises essentially the two single stage magnetic amplifiers 13 and 14 and the transformer 12. A center tap 18 to the primary of transformer 12 is provided to connect an alternating current source 15 and a tap 19 is provided to connect the other side of the alternating current source to one side of each of the magnetic amplifiers 13 and 14. Taps 16 and 17 are provided in the secondary of the transformer to connect to the load 11. The input to the transformer 12 is controlled by the magnetic amplifiers 13 and 14.

Figure 2:
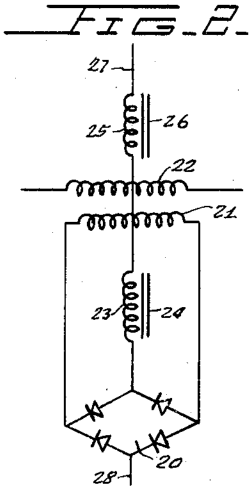
Fig. 2 is a detail diagram illustrating the nature of the magnetic amplifiers shown in the boxes of Fig. 1.
Figures 5, 6:
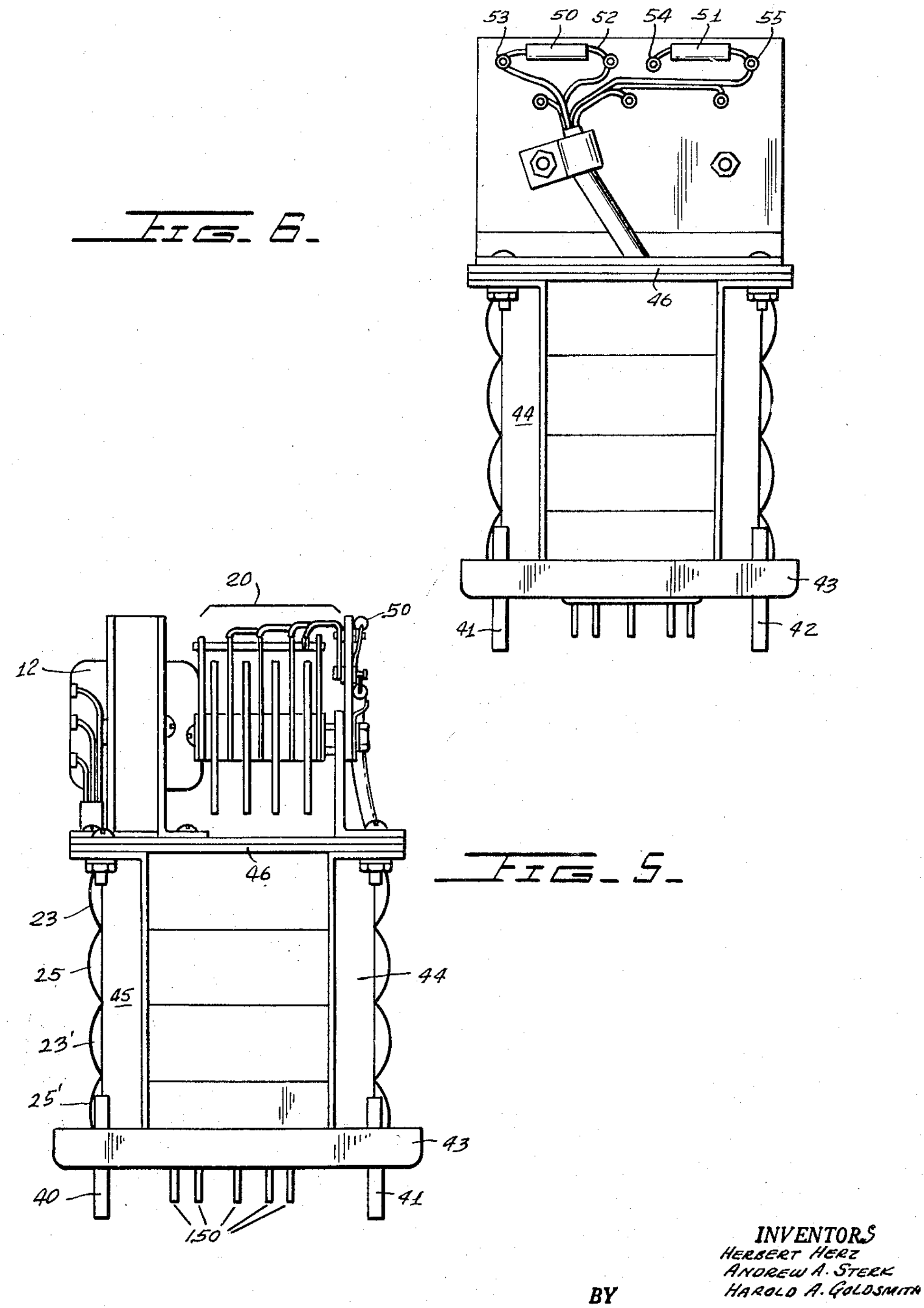
Figs. 5 and 6 are side and front elevations, respectively, of the complete packaged amplifier.

Each of the single stage magnetic amplifiers 13 and 14 comprises the means shown diagrammatically in Fig. 2. In this amplifier the two magnetic cores 24 and 26 have power windings 23 and 25 one side of which is connected to the alternating current source 15 through tap 18, one half of the primary of transformer 12 and line 27. The control current in coil 22 acts in the normal way in magnetic amplifiers, by increasing the saturation of the cores 24 and 26. The main current from source 15 passes through windings 25 and 23 and thence to the full bridge rectifier 20 and to line 28, back to the other side of source 15. The rectified current from the bridge 20 is passed through the feedback winding 21. The winding 21 is wound in such a way that no appreciable voltage is induced therein from windings 23 and 25. The direct current flowing in winding 21 adds to the action of the current in the control winding 22 and thus increases the gain in the magnetic amplifier. For purpose of gain adjustment a fixed resistor is sometimes connected across winding 21 and regulates the amount of feedback which determines the gain of the amplifier. This resistor is shown in Figs. 5 and 6 items 50 and 51.

Figure 3:
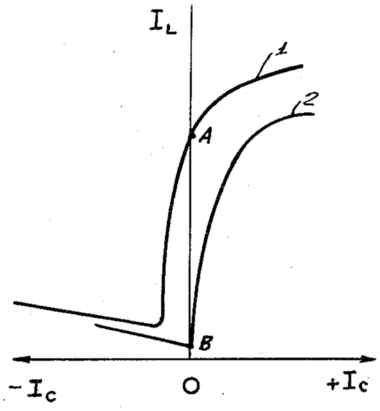
Fig. 3 is a graph illustrating the result of biasing of the magnetic amplifier.

Curve 1 of the Fig. 3 shows how the current ($I_1$) in the power windings 23 and 25 changes as a function of the control current ($I_c$) in 22. Negative values of $I_c$, the control current, mean that the polarity of the control current is such to oppose the feedback current and positive values mean that the control and feedback current have the same polarity. It can be seen that there is an appreciable quiescent current (A). In the push-pull circuit of Fig. 1 this quiescent current will flow from generator 15 through half of the primary of transformer 12, and magnetic amplifier 13 on one side and from generator 15, other half of the primary of transformer 12, magnetic amplifier 14 on the other side. The transformer 12 is connected to the load 11 so that the current in load 11 is the difference between the two currents through magnetic amplifiers 13 and 14. When the two magnetic amplifiers 13 and 14 are the same and have the same quiescent current no current will flow in load 11. Thus no bias current is necessary to prevent the flow of current in the load 11 and as stated above bias in the ordinary sense is not required. The usual way to provide bias in prior art devices is to circulate a constant direct current in a separate bias winding which is wound in a similar manner to the control and feed-back winding (so that no appreciable voltage is induced therein from the power windings). Such a bias winding must be supplied from a separate current source such as a rectifier or battery.

It will be noted, however, from Fig. 3, that a large circulating current flows in the magnetic amplifiers and even though this current is not reflected in the load 11 it is still undesirable as it reduces the gain and efficiency of the system. The circulating current can be reduced by reducing the amount of feedback. This expedient however has the disadvantage of reducing the gain of the amplifier.

Although bias current is not necessary in the ordinary sense, i. e., to prevent the reflection of quiescent current in the load, a bias current may be introduced as a desirable way of reducing the quiescent circulating current in the magnetic amplifier circuit. When this is done the characteristic curve is shifted to position 2 of Fig. 3. The quiescent current B is now quite low.

Figure 4:
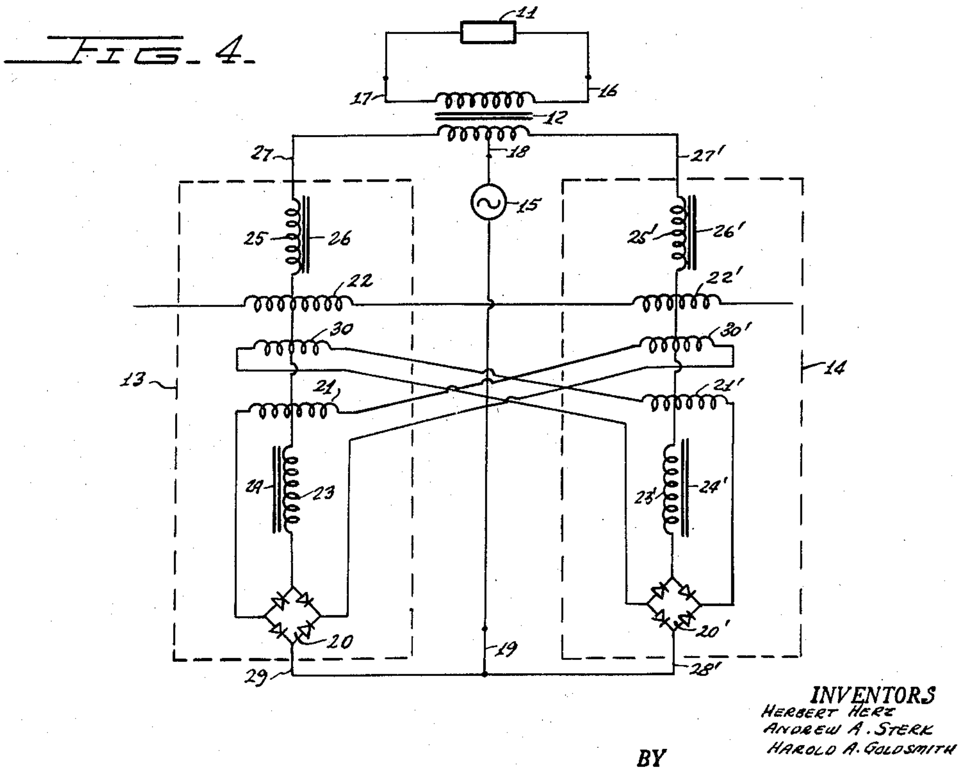
Fig. 4 is a circuit diagram of one form of the invention.

Fig. 4 illustrates how to provide for the shifting of the characteristic as shown in curve 2 of Fig. 3 whereby (*a*) no separate source of D. C. is required, (*b*) the biasing current is not constant but is self-adjusting in such a way as to increase the gain and stability of the amplifier and (*c*) the biasing current is automatic and self-regulating for changes in line voltage. Like numbers refer to like parts throughout the specification.

The circuit of Fig. 4 is substantially the same as the circuit of Figs. 1 and 2 except that each of the magnetic amplifiers 13 and 14 (shown in dotted lines) includes a bias winding 30 or 30' which is wound in such a way as to have a voltage induced therein by the feedback coil 21' or 21, respectively, of the opposite amplifier. The circuit of Fig. 4 operates as follows. The load 11 is connected through the push-pull transformer 12 and the two magnetic amplifiers 13 and 14 to the A. C. line 15.

The magnetic amplifier 13 consists of two cores 24 and 26, two power windings 23 and 25, the full bridge rectifier 20, a feedback winding 21 a control winding 22, and a bias winding 30′ (shown in box 14). The magnetic amplifier 14 has components which are substantially identical and which are numbered similarly. The bias winding 30′ is constructed to shift the quiescent circulating current in magnetic amplifier 14 to approximately the position indicated at B on Fig. 3. It will be noted that the bias current is not constant but depends on the feedback current of the opposite magnetic amplifier. This provides a stabilizing action and increases the gain of the unit. At the same time it will be noted that no separate rectifier or battery is required to furnish the bias for the unit and this fact helps make the "packaged" amplifier practical.

Figs. 5 and 6 illustrate how the parts of the amplifier of Fig. 4 can be combined into a unitary package. It will be realized that in these figures all the parts are not visible. The device is equipped with a frame 44, 45, 46 to which are secured mounting studs 40, 41, 42 and the can bottom 43 into which a shield (not shown) covering all or a part of the unit can be fitted. The transformer 12 is shown on the top frame member 46 as are the rectifier units 20, 20′ (only one shown). Resistors 50, 51 are soldered to connectors 52, 53, and 54, 55 respectively. These resistors 50 and 51 can be soldered into the device at the time of installation of the device and will vary in value depending on the use to which the magnetic amplifier is to be put. The lower end of the device contains the hermetically sealed terminals 150. There are 8 hermetically sealed terminals in this particular packaged amplifier. Two are connected to the input (18 and 19 of Figs. 1 and 4); two are connected to the transformer output 16 and 17; two are connected to control winding 22; and two are connected to another control winding (not shown), wound in the same way as winding 22. The toroids 23, 25, 23′ and 25′ are shown in these figures.

It will be seen that this invention provides a magnetic amplifier circuit which can be manufactured in the form of a package which packaged amplifier is ready for operation immediately upon being inserted into a circuit. The amplifier can be tested and adjusted prior to installation so that it does not require the services of a highly trained expert to install it. The amplifiers of the invention are especially useful for insertion into servomotor types of mechanisms.

We claim:

1. In a magnetic amplifier, a transformer having a primary and a secondary winding, a first magnetic amplifier unit and a second magnetic amplifier unit substantially identical with said first unit, said two amplifiers having separate magnetic core portions and connected output circuit portions, one side of each of the output circuit portions of said two amplifiers being connected to a common terminal, the opposite side of each of said circuit portions of said magnetic amplifier units being connected push-pull to the primary of said transformer, the first of said magnetic amplifier units having a feed back and biasing circuit comprising in series a rectifier, a feed back coil means about the core of said first magnetic amplifier and biasing coil means about the core of said second magnetic amplifier unit whereby said biasing coil means operates to minimize the quiescent current in said first unit, the second of said magnetic amplifier units having a similar feed back and biasing circuit to minimize quiescent current in said second unit, said primary having an intermediate tap whereby an alternating current power source may be connected between said intermediate tap and the common terminal of said magnetic amplifier units, the secondary of said transformer having terminals for connecting to a load.

2. As an article of manufacture, a self contained, packaged magnetic amplifier which is ready for operation when inserted in a circuit comprising a hermetically sealed package containing a transformer having a primary and a second winding, a first magnetic amplifier unit and a second magnetic amplifier unit substantially identical with said first unit, said two amplifiers having separate magnetic core portions and connected output circuit portions, one side of each of the output circuit portions of said two amplifiers being connected to a common terminal extending from said package, the opposite side of each of said circuit portions of said magnetic amplifier units being connected push-pull to the primary of said transformer, an interconnected control circuit portion for said amplifiers, the terminals for said control circuit portion extending from said package, the first of said magnetic amplifier units having a feed back and biasing circuit comprising in series a rectifier, a feed back coil means about the core of said first magnetic amplifier and biasing coil means about the core of said second magnetic amplifier unit whereby said biasing coil means operates to minimize the quiescent current in said first unit, the second of said magnetic amplifier units having a similar feed back and biasing circuit to minimize the quiescent current in said second unit, said primary having an intermediate tap extending from said package whereby an alternating current power source may be connected between said intermediate tap and the common terminal of said magnetic amplifier units, the secondary of said transformer having terminals extending from said package for connecting to a load.

References Cited in the file of this patent

UNITED STATES PATENTS

| | | |
|---|---|---|
| 2,519,415 | Thomas | Aug. 22, 1950 |
| 2,560,320 | Winkler | July 10, 1951 |
| 2,584,856 | FitzGerald | Feb. 5, 1952 |
| 2,617,090 | Ogle | Nov. 4, 1952 |

FOREIGN PATENTS

| | | |
|---|---|---|
| 106,111 | Sweden | Oct. 15, 1942 |
| 631,808 | Great Britain | Nov. 10, 1949 |

OTHER REFERENCES

Article on "Magnetic Amplifiers of the Balance Detector Type—Their Basic Principles, Characteristics, and Applications," by W. A. Geyger; AIEE Miscellaneous Paper 50—93, December 1939.